United States Patent
Dropps et al.

(10) Patent No.: US 8,295,299 B2
(45) Date of Patent: Oct. 23, 2012

(54) HIGH SPEED FIBRE CHANNEL SWITCH ELEMENT

(75) Inventors: Frank R. Dropps, Maple Grove, MN (US); Ernest G. Kohlwey, Eagan, MN (US); Mark A. Owen, Apple Valley, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 1179 days.

(21) Appl. No.: 10/956,501

(22) Filed: Oct. 1, 2004

(65) Prior Publication Data

US 2006/0072473 A1 Apr. 6, 2006

(51) Int. Cl.
*H04L 12/28* (2006.01)
(52) U.S. Cl. ........................... 370/427; 370/391
(58) Field of Classification Search .................. 370/229, 370/230, 231, 232, 233, 234, 235, 236, 403, 370/404, 405, 406, 389, 390, 391, 392, 351, 370/412, 514, 394, 352, 360, 396, 395, 398, 370/423, 427
See application file for complete search history.

(56) References Cited

U.S. PATENT DOCUMENTS

| | | | |
|---|---|---|---|
| 4,081,612 A | 3/1978 | Hafner | |
| 4,162,375 A | 7/1979 | Schilichte | 179/15 |
| 4,200,929 A | 4/1980 | Davidjuk et al. | |
| 4,258,418 A | 3/1981 | Heath | |
| 4,344,132 A | 8/1982 | Dixon et al. | |
| 4,382,159 A | 5/1983 | Bowditch | |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,691,296 A | 9/1987 | Struger | |
| 4,716,561 A | 12/1987 | Angell et al. | |
| 4,725,835 A | 2/1988 | Schreiner et al. | 340/825.83 |
| 4,821,034 A | 4/1989 | Anderson et al. | 340/825 |
| 4,860,193 A | 8/1989 | Bentley et al. | |
| 4,964,119 A | 10/1990 | Endo et al. | |
| 4,980,857 A | 12/1990 | Walter et al. | |
| 5,025,370 A | 6/1991 | Koegel et al. | |

(Continued)

FOREIGN PATENT DOCUMENTS

EP 0649098 9/1994

(Continued)

OTHER PUBLICATIONS

Banks, David C., et al., "Link Trunking and Measuring Link Latency in Fibre Channel Fabric", U.S. Appl. No. 60/286,046, 1-52.

(Continued)

*Primary Examiner* — Kibrom T Hailu
*Assistant Examiner* — Dady Chery
(74) *Attorney, Agent, or Firm* — Klein, O'Neill & Singh, LLP (57) ABSTRACT

A high-speed Fiber Channel switch element in a Fiber Channel network is provided. The Fiber Channel switch element includes, a rate select module that allows a port in the Fiber Channel switch element to operate at a rate equal to and/or higher than 10 gigabits per second ("G"). The port may operate at 20G, 40G or at a rate greater than 40G. Also, a cut status is provided for cut-through routing between ports operating at different speed. Plural transmit and receive lines are used for port operation at a rate equal to or higher than 10G.

24 Claims, 5 Drawing Sheets

U.S. PATENT DOCUMENTS

| | | | |
|---|---|---|---|
| 5,051,742 A | 9/1991 | Hullett et al. | |
| 5,090,011 A | 2/1992 | Fukuta et al. | |
| 5,115,430 A | 5/1992 | Hahne et al. | |
| 5,144,622 A | 9/1992 | Takiyasu et al. | 370/85.13 |
| 5,258,751 A | 11/1993 | DeLuca et al. | |
| 5,260,933 A | 11/1993 | Rouse | |
| 5,260,935 A | 11/1993 | Turner | |
| 5,280,483 A | 1/1994 | Kamoi et al. | |
| 5,291,481 A | 3/1994 | Doshi et al. | |
| 5,339,311 A | 8/1994 | Turner | |
| 5,367,520 A | 11/1994 | Cordell | 370/60 |
| 5,390,173 A | 2/1995 | Spinney et al. | |
| 5,425,022 A | 6/1995 | Clark et al. | |
| 5,537,400 A | 7/1996 | Diaz et al. | |
| 5,568,165 A | 10/1996 | Kimura | |
| 5,568,167 A | 10/1996 | Galbi et al. | |
| 5,579,443 A | 11/1996 | Tatematsu et al. | |
| 5,590,125 A | 12/1996 | Acampora et al. | |
| 5,594,672 A | 1/1997 | Hicks | |
| 5,598,541 A | 1/1997 | Malladi | 395/286 |
| 5,610,745 A | 3/1997 | Bennett | 359/139 |
| 5,623,492 A | 4/1997 | Teraslinna | |
| 5,638,518 A | 6/1997 | Malladi | |
| 5,666,483 A | 9/1997 | McClary | |
| 5,677,909 A | 10/1997 | Heide | |
| 5,687,172 A | 11/1997 | Cloonan et al. | 370/395 |
| 5,687,387 A | 11/1997 | Endejan et al. | |
| 5,701,416 A | 12/1997 | Thorson et al. | |
| 5,706,279 A | 1/1998 | Teraslinna | |
| 5,732,206 A | 3/1998 | Mendel | |
| 5,748,612 A | 5/1998 | Stoevhase et al. | 370/230 |
| 5,751,710 A * | 5/1998 | Crowther et al. | 370/423 |
| 5,757,771 A | 5/1998 | Li et al. | |
| 5,764,927 A | 6/1998 | Murphy et al. | |
| 5,768,271 A | 6/1998 | Seid et al. | |
| 5,768,533 A | 6/1998 | Ran | |
| 5,784,358 A | 7/1998 | Smith et al. | |
| 5,790,545 A | 8/1998 | Holt et al. | |
| 5,790,840 A | 8/1998 | Bulka et al. | |
| 5,812,525 A | 9/1998 | Teraslinna | |
| 5,818,842 A | 10/1998 | Burwell et al. | 370/397 |
| 5,821,875 A | 10/1998 | Lee et al. | |
| 5,822,300 A | 10/1998 | Johnson et al. | |
| 5,825,748 A | 10/1998 | Barkey et al. | |
| 5,828,475 A | 10/1998 | Bennett et al. | |
| 5,835,748 A | 11/1998 | Orenstein et al. | |
| 5,835,752 A | 11/1998 | Chiang et al. | |
| 5,850,386 A | 12/1998 | Anderson et al. | |
| 5,892,604 A | 4/1999 | Yamanaka et al. | |
| 5,894,560 A | 4/1999 | Carmichael et al. | |
| 5,920,705 A * | 7/1999 | Lyon et al. | 709/240 |
| 5,925,119 A | 7/1999 | Maroney | |
| 5,936,442 A | 8/1999 | Liu et al. | |
| 5,954,796 A | 9/1999 | McCarty et al. | |
| 5,974,547 A | 10/1999 | Klimenko | |
| 5,978,359 A | 11/1999 | Caldara et al. | |
| 5,978,379 A | 11/1999 | Chan et al. | |
| 5,987,028 A | 11/1999 | Yang et al. | 370/380 |
| 5,999,528 A | 12/1999 | Chow et al. | 370/365 |
| 6,009,226 A | 12/1999 | Tsuji et al. | |
| 6,011,779 A | 1/2000 | Wills | |
| 6,014,383 A | 1/2000 | McCarty | 370/453 |
| 6,021,128 A | 2/2000 | Hosoya et al. | 370/380 |
| 6,026,092 A | 2/2000 | Abu-Amara et al. | |
| 6,031,842 A | 2/2000 | Trevitt et al. | |
| 6,046,979 A | 4/2000 | Bauman | |
| 6,047,323 A | 4/2000 | Krause | 709/227 |
| 6,055,618 A | 4/2000 | Thorson | |
| 6,061,360 A | 5/2000 | Miller et al. | |
| 6,081,512 A | 6/2000 | Muller et al. | 370/256 |
| 6,108,738 A | 8/2000 | Chambers et al. | |
| 6,108,778 A | 8/2000 | LaBerge | |
| 6,118,776 A | 9/2000 | Berman | |
| 6,118,791 A | 9/2000 | Fichou et al. | |
| 6,128,292 A | 10/2000 | Kim et al. | 370/356 |
| 6,131,123 A | 10/2000 | Hurst et al. | |
| 6,134,127 A | 10/2000 | Kirchberg | |
| 6,144,668 A | 11/2000 | Bass et al. | |
| 6,147,976 A | 11/2000 | Shand et al. | |
| 6,148,421 A | 11/2000 | Hoese et al. | |
| 6,151,644 A | 11/2000 | Wu | |
| 6,158,014 A | 12/2000 | Henson | |
| 6,160,813 A | 12/2000 | Banks et al. | 370/422 |
| 6,185,203 B1 * | 2/2001 | Berman | 370/351 |
| 6,201,787 B1 | 3/2001 | Baldwin et al. | |
| 6,209,089 B1 | 3/2001 | Selitrennikoff et al. | |
| 6,229,822 B1 | 5/2001 | Chow et al. | |
| 6,230,276 B1 | 5/2001 | Hayden | |
| 6,240,096 B1 | 5/2001 | Book | |
| 6,252,891 B1 | 6/2001 | Perches | |
| 6,253,267 B1 | 6/2001 | Kim et al. | |
| 6,278,708 B1 | 8/2001 | Von Hammerstein et al. | |
| 6,286,011 B1 | 9/2001 | Velamuri et al. | |
| 6,289,002 B1 | 9/2001 | Henson et al. | |
| 6,301,612 B1 | 10/2001 | Selitrennikoff et al. | |
| 6,307,857 B1 | 10/2001 | Yokoyama et al. | |
| 6,308,220 B1 | 10/2001 | Mathur | 709/238 |
| 6,311,204 B1 | 10/2001 | Mills | |
| 6,324,181 B1 | 11/2001 | Wong et al. | 370/403 |
| 6,330,236 B1 | 12/2001 | Ofek et al. | 370/369 |
| 6,333,932 B1 | 12/2001 | Kobayasi et al. | |
| 6,335,935 B2 | 1/2002 | Kadambi et al. | |
| 6,339,813 B1 | 1/2002 | Smith et al. | |
| 6,343,324 B1 | 1/2002 | Hubis et al. | |
| 6,353,612 B1 | 3/2002 | Zhu et al. | |
| 6,370,605 B1 | 4/2002 | Chong | |
| 6,397,360 B1 | 5/2002 | Bruns | |
| 6,401,128 B1 | 6/2002 | Stai et al. | |
| 6,404,749 B1 | 6/2002 | Falk | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,342 B1 | 7/2002 | Schwartz et al. | |
| 6,421,711 B1 | 7/2002 | Blumenau et al. | |
| 6,424,658 B1 | 7/2002 | Mathur | 370/429 |
| 6,438,628 B1 | 8/2002 | Messerly et al. | |
| 6,449,274 B1 | 9/2002 | Holden et al. | 370/392 |
| 6,452,915 B1 | 9/2002 | Jorgensen | |
| 6,466,591 B1 | 10/2002 | See et al. | |
| 6,467,008 B1 | 10/2002 | Gentry et al. | |
| 6,470,026 B1 | 10/2002 | Pearson et al. | |
| 6,480,500 B1 | 11/2002 | Erimli et al. | |
| 6,509,988 B1 | 1/2003 | Saito | |
| 6,522,656 B1 | 2/2003 | Gridley | |
| 6,532,212 B1 | 3/2003 | Soloway et al. | |
| 6,553,036 B1 | 4/2003 | Miller et al. | |
| 6,563,796 B1 | 5/2003 | Saito | |
| 6,570,850 B1 | 5/2003 | Gutierrez et al. | |
| 6,570,853 B1 | 5/2003 | Johnson et al. | |
| 6,594,231 B1 | 7/2003 | Byham et al. | |
| 6,597,691 B1 | 7/2003 | Anderson et al. | 370/360 |
| 6,597,777 B1 | 7/2003 | Ho | |
| 6,606,690 B2 | 8/2003 | Padovano | |
| 6,614,796 B1 * | 9/2003 | Black et al. | 370/403 |
| 6,622,206 B1 | 9/2003 | Kanamaru et al. | |
| 6,625,157 B2 | 9/2003 | Niu et al. | |
| 6,629,161 B2 | 9/2003 | Matsuki et al. | |
| 6,643,298 B1 | 11/2003 | Brunheroto et al. | |
| 6,657,962 B1 | 12/2003 | Barri et al. | |
| 6,684,209 B1 | 1/2004 | Ito et al. | |
| 6,697,359 B1 | 2/2004 | George | 370/357 |
| 6,697,368 B2 | 2/2004 | Chang et al. | |
| 6,697,914 B1 | 2/2004 | Hospodor et al. | |
| 6,700,877 B1 | 3/2004 | Lorenz et al. | |
| 6,718,497 B1 | 4/2004 | Whitby-Strevens | |
| 6,738,381 B1 | 5/2004 | Agnevik et al. | |
| 6,744,772 B1 | 6/2004 | Eneboe et al. | |
| 6,760,302 B1 | 7/2004 | Ellinas et al. | |
| 6,765,871 B1 | 7/2004 | Knobel et al. | |
| 6,779,083 B2 | 8/2004 | Ito et al. | |
| 6,785,241 B1 | 8/2004 | Lu et al. | |
| 6,807,181 B1 | 10/2004 | Weschler | |
| 6,816,492 B1 | 11/2004 | Turner et al. | |
| 6,816,750 B1 | 11/2004 | Klaas | |
| 6,859,435 B1 | 2/2005 | Lee et al. | |
| 6,865,155 B1 | 3/2005 | Wong et al. | |
| 6,865,157 B1 | 3/2005 | Scott et al. | |

| | | | | | | |
|---|---|---|---|---|---|---|
| 6,886,141 B1 | 4/2005 | Kunz et al. | 7,424,533 B1 | 9/2008 | Di Benedetto et al. | |
| 6,888,831 B1 | 5/2005 | Hospodor et al. | 7,443,794 B2 | 10/2008 | George et al. | |
| 6,901,072 B1 | 5/2005 | Wong | 7,447,224 B2 | 11/2008 | Dropps et al. | |
| 6,904,507 B2 | 6/2005 | Gil | 7,460,534 B1 | 12/2008 | Bellenger | |
| 6,922,408 B2 | 7/2005 | Bloch et al. | 7,466,700 B2 | 12/2008 | Dropps et al. | |
| 6,928,470 B1 | 8/2005 | Hamlin | 7,471,691 B2 | 12/2008 | Black et al. | |
| 6,934,799 B2 | 8/2005 | Acharya et al. | 7,492,780 B1 | 2/2009 | Goolsby | |
| 6,941,357 B2 | 9/2005 | Nguyen et al. | 7,616,637 B1 | 11/2009 | Lee et al. | |
| 6,941,482 B2 | 9/2005 | Strong | 7,646,767 B2 | 1/2010 | Dropps et al. | |
| 6,947,393 B2 | 9/2005 | Hooper, III | 2001/0011357 A1 | 8/2001 | Mori | |
| 6,952,659 B2 | 10/2005 | King et al. | 2001/0022823 A1 | 9/2001 | Renaud | |
| 6,968,463 B2 | 11/2005 | Pherson et al. | 2001/0033552 A1 | 10/2001 | Barrack et al. | |
| 6,975,627 B1 | 12/2005 | Parry et al. | 2001/0038628 A1 | 11/2001 | Ofek et al. | 370/392 |
| 6,983,342 B2 | 1/2006 | Helenic et al. | 2001/0043564 A1 | 11/2001 | Bloch et al. | |
| 6,987,768 B1 | 1/2006 | Kojima et al. | 2001/0047460 A1 | 11/2001 | Kobayashi et al. | |
| 6,988,130 B1 | 1/2006 | Blumenau et al. | 2002/0016838 A1 | 2/2002 | Geluc et al. | |
| 6,988,149 B2 | 1/2006 | Odenwald | 2002/0034178 A1 | 3/2002 | Schmidt et al. | |
| 7,000,025 B1 | 2/2006 | Wilson | 2002/0067726 A1 | 6/2002 | Ganesh et al. | |
| 7,002,926 B1 | 2/2006 | Eneboe et al. | 2002/0071387 A1 | 6/2002 | Horiguchi et al. | |
| 7,010,607 B1 | 3/2006 | Bunton | 2002/0103913 A1 | 8/2002 | Tawil et al. | |
| 7,024,410 B2 | 4/2006 | Ito et al. | 2002/0104039 A1 | 8/2002 | DeRolf et al. | |
| 7,031,615 B2 | 4/2006 | Genrile | 2002/0118692 A1 | 8/2002 | Oberman et al. | |
| 7,039,070 B2 | 5/2006 | Kawakatsu | 2002/0122428 A1 | 9/2002 | Fan et al. | |
| 7,039,870 B2 | 5/2006 | Takaoka et al. | 2002/0124102 A1 | 9/2002 | Kramer et al. | |
| 7,047,326 B1 | 5/2006 | Crosbie et al. | 2002/0124124 A1 | 9/2002 | Matsumoto et al. | |
| 7,050,392 B2 | 5/2006 | Valdevit | 2002/0146022 A1 | 10/2002 | Van Doren et al. | |
| 7,051,182 B2 | 5/2006 | Blumenau et al. | 2002/0147560 A1 | 10/2002 | Devins et al. | |
| 7,055,068 B2 | 5/2006 | Riedl | 2002/0147843 A1 | 10/2002 | Rao | |
| 7,061,862 B2 | 6/2006 | Horiguchi et al. | 2002/0156918 A1 | 10/2002 | Valdevit et al. | |
| 7,061,871 B2 | 6/2006 | Sheldon et al. | 2002/0159385 A1 | 10/2002 | Susnow et al. | |
| 7,076,569 B1 | 7/2006 | Bailey et al. | 2002/0172195 A1 | 11/2002 | Pekkala et al. | |
| 7,082,126 B2 | 7/2006 | Ain et al. | 2002/0174197 A1 | 11/2002 | Schimke et al. | |
| 7,092,374 B1 | 8/2006 | Gubbi | 2002/0176450 A1 | 11/2002 | Kong et al. | |
| 7,110,394 B1 | 9/2006 | Chamdani et al. | 2002/0191602 A1 | 12/2002 | Woodring et al. | |
| 7,113,512 B1 | 9/2006 | Holmgren et al. | 2002/0194294 A1 | 12/2002 | Blumenau et al. | |
| 7,120,728 B2 | 10/2006 | Krakirian et al. | 2002/0196773 A1 | 12/2002 | Berman | |
| 7,123,306 B1 | 10/2006 | Goto et al. | 2003/0002503 A1 | 1/2003 | Brewer et al. | |
| 7,124,169 B2 | 10/2006 | Shimozono et al. | 2003/0002516 A1 | 1/2003 | Boock et al. | |
| 7,150,021 B1 | 12/2006 | Vajjhala et al. | 2003/0016683 A1 | 1/2003 | George et al. | |
| 7,151,778 B2 | 12/2006 | Zhu et al. | 2003/0021239 A1 | 1/2003 | Mullendore et al. | |
| 7,171,050 B2 | 1/2007 | Kim | 2003/0026267 A1 | 2/2003 | Oberman et al. | |
| 7,185,062 B2 | 2/2007 | Lolayekar et al. | 2003/0026287 A1 | 2/2003 | Mullendore et al. | |
| 7,187,688 B2 | 3/2007 | Garmire et al. | 2003/0033487 A1 | 2/2003 | Pfister et al. | |
| 7,188,364 B2 | 3/2007 | Volpano | 2003/0035433 A1 | 2/2003 | Craddock et al. | |
| 7,190,667 B2 | 3/2007 | Susnow et al. | 2003/0037159 A1 | 2/2003 | Zhao et al. | |
| 7,194,538 B1 | 3/2007 | Rabe et al. | 2003/0046396 A1 | 3/2003 | Richter et al. | |
| 7,200,108 B2 | 4/2007 | Beer et al. | 2003/0056000 A1 | 3/2003 | Mullendore et al. | |
| 7,200,610 B1 | 4/2007 | Prawdiuk et al. | 2003/0063567 A1 | 4/2003 | Dehart | |
| 7,209,478 B2 | 4/2007 | Rojas et al. | 2003/0072316 A1 | 4/2003 | Niu et al. | |
| 7,215,680 B2 | 5/2007 | Mullendore et al. | 2003/0076788 A1 | 4/2003 | Grabauskas et al. | |
| 7,221,650 B1 | 5/2007 | Cooper et al. | 2003/0079019 A1 | 4/2003 | Lolayekar et al. | |
| 7,230,929 B2 | 6/2007 | Betker et al. | 2003/0084219 A1 | 5/2003 | Yao et al. | |
| 7,233,570 B2 | 6/2007 | Gregg | 2003/0086377 A1 | 5/2003 | Berman | |
| 7,233,985 B2 | 6/2007 | Hahn et al. | 2003/0091062 A1* | 5/2003 | Lay et al. | 370/463 |
| 7,239,641 B1 | 7/2007 | Banks et al. | 2003/0093607 A1 | 5/2003 | Main et al. | |
| 7,245,613 B1 | 7/2007 | Winkles et al. | 2003/0095549 A1 | 5/2003 | Berman | |
| 7,245,627 B2 | 7/2007 | Goldenberg et al. | 2003/0103451 A1 | 6/2003 | Lutgen et al. | |
| 7,248,580 B2 | 7/2007 | George et al. | 2003/0112819 A1 | 6/2003 | Kofoed et al. | |
| 7,263,593 B2 | 8/2007 | Honda et al. | 2003/0115355 A1 | 6/2003 | Cometto et al. | |
| 7,266,286 B2 | 9/2007 | Tanizawa et al. | 2003/0117961 A1 | 6/2003 | Chuah et al. | |
| 7,269,131 B2 | 9/2007 | Cashman et al. | 2003/0118053 A1 | 6/2003 | Edsall et al. | |
| 7,269,168 B2 | 9/2007 | Roy et al. | 2003/0120743 A1 | 6/2003 | Coatney et al. | |
| 7,275,103 B1 | 9/2007 | Thrasher et al. | 2003/0120791 A1 | 6/2003 | Weber et al. | |
| 7,277,431 B2 | 10/2007 | Walter et al. | 2003/0120983 A1 | 6/2003 | Vieregge et al. | |
| 7,287,063 B2 | 10/2007 | Baldwin et al. | 2003/0123455 A1 | 7/2003 | Zhao et al. | |
| 7,292,593 B1 | 11/2007 | Winkles et al. | 2003/0126223 A1 | 7/2003 | Jenne et al. | |
| 7,310,389 B2 | 12/2007 | Waschura et al. | 2003/0126242 A1 | 7/2003 | Chang | |
| 7,315,511 B2 | 1/2008 | Morita et al. | 2003/0131105 A1 | 7/2003 | Czeiger et al. | |
| 7,319,669 B1 | 1/2008 | Kunz et al. | 2003/0137941 A1 | 7/2003 | Kaushik et al. | |
| 7,327,680 B1 | 2/2008 | Kloth | 2003/0139900 A1 | 7/2003 | Robison | |
| 7,334,046 B1 | 2/2008 | Betker | 2003/0152076 A1 | 8/2003 | Lee et al. | |
| 7,346,707 B1 | 3/2008 | Erimli | 2003/0172149 A1 | 9/2003 | Edsall et al. | |
| 7,352,701 B1 | 4/2008 | Kunz | 2003/0172239 A1 | 9/2003 | Swank | |
| 7,352,740 B2 | 4/2008 | Hammons et al. | 2003/0174652 A1 | 9/2003 | Ebata | |
| 7,362,702 B2 | 4/2008 | Terrell et al. | 2003/0174721 A1 | 9/2003 | Black et al. | |
| 7,366,100 B2 | 4/2008 | Anderson et al. | 2003/0174789 A1 | 9/2003 | Waschura et al. | |
| 7,397,788 B2 | 7/2008 | Mies et al. | 2003/0179709 A1 | 9/2003 | Huff | |
| 7,406,034 B1 | 7/2008 | Cometto et al. | 2003/0179748 A1 | 9/2003 | George et al. | |
| 7,406,092 B2 | 7/2008 | Dropps et al. | 2003/0179755 A1 | 9/2003 | Fraser | |

| | | | |
|---|---|---|---|
| 2003/0189930 A1 | 10/2003 | Terrell et al. | |
| 2003/0189935 A1 | 10/2003 | Warden et al. | |
| 2003/0191857 A1 | 10/2003 | Terell et al. | |
| 2003/0191883 A1* | 10/2003 | April | 710/305 |
| 2003/0195983 A1 | 10/2003 | Krause | |
| 2003/0198238 A1 | 10/2003 | Westby | |
| 2003/0200315 A1 | 10/2003 | Goldenberg et al. | |
| 2003/0218986 A1 | 11/2003 | DeSanti et al. | |
| 2003/0229808 A1 | 12/2003 | Heintz et al. | |
| 2003/0236953 A1 | 12/2003 | Grieff et al. | |
| 2004/0013088 A1 | 1/2004 | Gregg | |
| 2004/0013092 A1 | 1/2004 | Betker et al. | |
| 2004/0013113 A1 | 1/2004 | Singh et al. | |
| 2004/0013125 A1 | 1/2004 | Betker et al. | |
| 2004/0015638 A1 | 1/2004 | Forbes | |
| 2004/0024831 A1 | 2/2004 | Yang et al. | |
| 2004/0027989 A1 | 2/2004 | Martin et al. | |
| 2004/0028038 A1 | 2/2004 | Anderson et al. | |
| 2004/0030766 A1* | 2/2004 | Witkowski | 709/223 |
| 2004/0054776 A1 | 3/2004 | Klotz et al. | |
| 2004/0054866 A1 | 3/2004 | Blumenau et al. | |
| 2004/0057389 A1 | 3/2004 | Klotz et al. | |
| 2004/0064664 A1 | 4/2004 | Gil | |
| 2004/0081186 A1 | 4/2004 | Warren et al. | |
| 2004/0081196 A1 | 4/2004 | Elliott | |
| 2004/0081394 A1 | 4/2004 | Biran et al. | |
| 2004/0085955 A1 | 5/2004 | Walter et al. | |
| 2004/0085974 A1 | 5/2004 | Mies et al. | |
| 2004/0085994 A1 | 5/2004 | Warren et al. | |
| 2004/0088444 A1 | 5/2004 | Baumer | |
| 2004/0092278 A1 | 5/2004 | Diepstraten et al. | |
| 2004/0100944 A1 | 5/2004 | Richmond et al. | |
| 2004/0109418 A1 | 6/2004 | Fedorkow et al. | |
| 2004/0123181 A1 | 6/2004 | Moon et al. | |
| 2004/0125799 A1 | 7/2004 | Buer | |
| 2004/0141518 A1 | 7/2004 | Milligan et al. | |
| 2004/0141521 A1 | 7/2004 | George | 370/463 |
| 2004/0151188 A1 | 8/2004 | Maveli et al. | |
| 2004/0153526 A1 | 8/2004 | Haun et al. | |
| 2004/0153566 A1 | 8/2004 | Lalsangi et al. | |
| 2004/0153863 A1 | 8/2004 | Klotz et al. | |
| 2004/0153914 A1 | 8/2004 | El-Batal | |
| 2004/0174813 A1 | 9/2004 | Kasper et al. | |
| 2004/0202189 A1 | 10/2004 | Arndt et al. | |
| 2004/0208201 A1 | 10/2004 | Otake | |
| 2004/0218531 A1 | 11/2004 | Cherian et al. | |
| 2004/0267982 A1 | 12/2004 | Jackson et al. | |
| 2005/0018673 A1 | 1/2005 | Dropps et al. | |
| 2005/0023656 A1 | 2/2005 | Leedy | |
| 2005/0036485 A1 | 2/2005 | Eilers et al. | |
| 2005/0036499 A1 | 2/2005 | Dutt et al. | |
| 2005/0036763 A1 | 2/2005 | Kato et al. | |
| 2005/0047334 A1 | 3/2005 | Paul et al. | |
| 2005/0073956 A1 | 4/2005 | Moores et al. | |
| 2005/0076113 A1 | 4/2005 | Klotz et al. | |
| 2005/0088969 A1 | 4/2005 | Carlsen et al. | |
| 2005/0099970 A1* | 5/2005 | Halliday | 370/321 |
| 2005/0108444 A1 | 5/2005 | Flauaus et al. | |
| 2005/0111845 A1 | 5/2005 | Nelson et al. | |
| 2005/0117522 A1 | 6/2005 | Basavaiah et al. | |
| 2005/0177641 A1 | 8/2005 | Yamagami | |
| 2005/0198523 A1 | 9/2005 | Shanbhag et al. | |
| 2006/0013248 A1 | 1/2006 | Mujeeb et al. | |
| 2006/0034192 A1 | 2/2006 | Hurley et al. | |
| 2006/0034302 A1 | 2/2006 | Peterson | |
| 2006/0047852 A1 | 3/2006 | Shah et al. | |
| 2006/0067317 A1 | 3/2006 | Engstrand et al. | |
| 2006/0074927 A1 | 4/2006 | Sullivan et al. | |
| 2006/0107260 A1 | 5/2006 | Motta | |
| 2006/0143300 A1 | 6/2006 | See et al. | |
| 2006/0184711 A1 | 8/2006 | Pettey | |
| 2006/0203725 A1 | 9/2006 | Paul et al. | |
| 2006/0274744 A1 | 12/2006 | Nagai et al. | |
| 2007/0206502 A1 | 9/2007 | Martin et al. | |

FOREIGN PATENT DOCUMENTS

| | | |
|---|---|---|
| EP | 0856969 | 1/1998 |
| GB | 2352371 | 1/2001 |
| WO | WO-98/36537 | 8/1998 |
| WO | WO-01/95566 | 12/2001 |
| WO | WO03/088059 | 10/2003 |

OTHER PUBLICATIONS

"Office Action from USPTO dated Dec. 7, 2007 for U.S. Appl. No. 10/961,463".

"Notice of Allowance from USPTO dated Dec. 21, 2007 for U.S. Appl. No. 10/961,463".

"Notice of Allowance from USPTO dated Dec. 20, 2007 for U.S. Appl. No. 10/889,337".

"Notice of Allowance from USPTO dated Jan. 8, 2008 for U.S. Appl. No. 10/889,551".

"Office Action from USPTO dated Jan. 9, 2008 for U.S. Appl. No. 10/798,468".

"Office Action from USPTO dated Jan. 9, 2008 for U.S. Appl. No. 11/608,634".

"Notice of Allowance from USPTO dated Jan. 11, 2008 for U.S. Appl. No. 10/664,548".

"Notice of Allowance from USPTO dated Jan. 10, 2008 for U.S. Appl. No. 10/263,858".

"Notice of Allowance from USPTO dated Feb. 8, 2008 for U.S. Appl. No. 10/894,529".

"Office Action from USPTO dated Feb. 12, 2008 for U.S. Appl. No. 11/057,912".

"Notice of Allowance from the USPTO dated Sep. 29, 2008 for U.S. Appl. No. 10/889,267".

"Final Office Action from USPTO dated Oct. 8, 2008 for U.S. Appl. No. 11/057,912".

"Non-Final Office Action from USPTO dated Oct. 10, 2008 for U.S. Appl. No. 10/894,627".

"Notice of Allowance from USPTO dated Oct. 8, 2008 for U.S. Appl. No. 10/889,255".

"Notice of Allowance from USPTO dated Oct. 8, 2008 for U.S. Appl. No. 10/798,527".

"Notice of Allowance from USPTO dated Oct. 15, 2008 for U.S. Appl. No. 10/894,492".

"Final Office Action from USPTO dated Oct. 17, 2008 for U.S. Appl. No. 10/894,595".

"Final Office Action from USPTO dated Nov. 13, 2008 for U.S. Appl. No. 10/894,587".

"Office Action from USPTO dated Nov. 13, 2008 for U.S. Appl. No. 10/894,917".

"Office Action from USPTO dated Nov. 26, 2008 for U.S. Appl. No. 10/956,502".

"Office Action from USPTO dated Nov. 26, 2008 for U.S. Appl. No. 10/894,547".

"Final Office Action from USPTO dated Dec. 24, 2008 for U.S. Appl. No. 10/894,726".

"Office Action from USPTO dated Dec. 23, 2008 for U.S. Appl. No. 10/798,468".

"Notice of Allowance from USPTO dated Dec. 30, 2008 for U.S. Appl. No. 11/037,922".

"Final Office Action from USPTO dated Jan. 21, 2009 for U.S. Appl. No. 10/894,827".

"Office Action from USPTO dated Jan. 17, 2009 for U.S. Appl. No. 10/894,586".

"Final Office Action from USPTO dated Jan. 26, 2009 for U.S. Appl. No. 10/895,175".

"Notice of Allowance from USPTO dated Feb. 10, 2009 for U.S. Appl. No. 10/894,595".

"Office Action from USPTO dated Feb. 17, 2009 for U.S. Appl. No. 10/894,732".

"Notice of Allowance from USPTO dated Feb. 25, 2009 for U.S. Appl. No. 10/894,827".

"Notice of Allowance from USPTO dated Feb. 27, 2009 for U.S. Appl. No. 10/895,175".

"Office Action from USPTO dated Mar. 5, 2008 for U.S. Appl. No. 10/889,259".

"Office Action from USPTO dated Mar. 7, 2008 for U.S. Appl. No. 10/894,629".

Clark, Tom, "Zoning for Fibre Channel Fabrics", Vixel Corporation Paper—XP002185194., (Aug. 1999), pp. 1-6.
Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.
Martin, Charles R., "Fabric Interconnection of fibre channel standard nodes", Proceedings of the SPIE, (Sep. 8, 1992), pp. 65-71.
Yoshida, Hu, "LUN Security Considerations for Storage Area Networks," Hitachi Data Systems Paper—XP 002185193 (1999), pp. 1-7.
Claudio DeSanti, "Virtual Fabrics Switch Support"; VF Switch Support, T11/04-395v2. Sep. 2004, pp. 1-15.
Pelissier et al, "Inter-Fabric Routing", dated Jul. 30, 2004, Inter Fabric Routing (04-520v0); pp. 1-31.
DeSanti et al, "Virtual Fabrics"; Virtual Fabrics, T11/03-352v0, May 2003; pp. 1-4.
Martin et al , "Virtual Channel Architecture", Presentation by Brocade to T11/03-369V0 dated Jun. 2, 2003.
Curtis, A. R., "Design Considerations for 10-Gbit Fibre Channel", *Curtis A. Ridgeway, Distinguished I/O Architect, Storage and Computing ASIC's Division, LSI Logic Corp.*
Malavalli, Kumar , "High Speed Fibre Channel Switching Fabric Devices", *Proceedings of the SPIE, SPIE*, Bellingham, VA, USA vol. 1577,, XP000562869, ISSN: 0277-786X,(Sep. 4, 1991),216-226.
Melhem, et al., "Minimizing Wavelength Conversions in WDM Path Establishment", *Computer Science Department, University of Pittsburgh*, Pittsburgh, PA 15260, (2001),197-211.
Ridgeway, Curt , "0GFC-40GFC using 4-lane XAUI's", *LSI Logic Presentation—T11/03-069v0*.
"Notice of Allowance from USPTO dated Apr. 4, 2008 for U.S. Appl. No. 11/608,634".
"Office Action from USPTO dated Apr. 4, 2008 for U.S. Appl. No. 10/957,465".
"Notice of Allowance from USPTO dated Apr. 10, 2008 for U.S. Appl. No. 10/241,153".
"Office Action from USPTO dated Apr. 11, 2008 for U.S. Appl. No. 10/894,595".
"Office Action from USPTO dated Apr. 14, 2008 for U.S. Appl. No. 10/894,627".
"Office Action from USPTO dated Apr. 17, 2008 for U.S. Appl. No. 10/894,689".
"Notice of Allowance from USPTO dated Apr. 18, 2008 for U.S. Appl. No. 10/894,597".
"Final Office Action from USPTO dated Apr. 23, 2008 for U.S. Appl. No. 10/889,255".
"Final Office Action from USPTO dated Apr. 25, 2008 for U.S. Appl. No. 10/894,579".
"Final Office Action from USPTO dated Apr. 29, 2008 for U.S. Appl. No. 10/894,491".
"Office Action from USPTO dated May 2, 2008 for U.S. Appl. No. 11/037,922".
"Final Office Action from USPTO dated May 12, 2008 for U.S. Appl. No. 10/894,492".
"Office Action from USPTO dated May 14, 2008 for U.S. Appl. No. 10/956,502".
"Office Action from USPTO dated May 15, 2008 for U.S. Appl. No. 10/798,527".
"Final Office Action from USPTO dated May 21, 2008 for U.S. Appl. No. 10/889,635".
"Final Office Action from USPTO dated Jun. 4, 2008 for U.S. Appl. No. 10/894,978".
"Final Office Action from USPTO dated Jun. 5, 2008 for U.S. Appl. No. 10/889,267".
"Final Office Action from USPTO dated Jun. 10, 2008 for U.S. Appl. No. 10/894,586".
"Office Action from USPTO dated Mar. 20, 2008 for U.S. Appl. No. 10/894,732".
"Final Office Action from USPTO dated Apr. 1, 2008 for U.S. Appl. No. 10/956,717".
"Office Action from USPTO dated Apr. 3, 2008 for U.S. Appl. No. 10/894,587".
"Office Action from USPTO dated Jun. 25, 2008 for U.S. Appl. No. 10/895,175".
"Notice of Allowance from USPTO dated Jun. 25, 2008 for U.S. Appl. No. 10/894,491".
"Notice of Allowance from USPTO dated Jun. 27, 2008 for U.S. Appl. No. 10/956,717".
"Office Action from USPTO dated Jun. 26, 2008 for U.S. Appl. No. 10/894,547".
"Office Action from USPTO dated Jun. 27, 2008 for U.S. Appl. No. 10/894,726".
"Final Office Action from USPTO dated Jul. 9, 2008 for U.S. Appl. No. 10/894,917".
"Notice of Allowance from USPTO dated Jul. 9, 2008 for U.S. Appl. No. 10/894,629".
"Notice of Allowance from USPTO dated Jul. 9, 2008 for U.S. Appl. No. 10/894,579".
"Notice of Allowance from USPTO dated Jul. 17, 2008 for U.S. Appl. No. 10/894,536".
"Office Action from USPTO dated Jul. 25, 2008 for U.S. Appl. No. 10/894,827".
"Office Action from State Intellectual Property Office (SIPO) of China for Chinese application 200580032889.0".
"Final Office Action from USPTO Dated Aug. 4, 2008 for U.S. Appl. No. 10/894,732".
"Notice of Allowance from USPTO dated Aug. 18, 2008 for U.S. Appl. No. 10/889,259".
International Preliminary Report on Patentability dated Apr. 3, 2007, for International patent application No. PCT/US2005/034844.
International Preliminary Report on Patentability dated Apr. 3, 2007, for International patent application No. PCT/US2005/034758.
International Preliminary Report on Patentability dated Apr. 11, 2007, for International patent application No. PCT/US2005/034845.
International Preliminary Report on Patentability dated Apr. 3, 2007, for International patent application No. PCT/US2005/035064.
International Preliminary Report on Patentability dated Jul. 24, 2007, for International patent application No. PCT/US2005/42528.
"Final Office Action from USPTO dated Aug. 20, 2008 for U.S. Appl. No. 10/798,468".
"Office Action from USPTO dated Sep. 18, 2008 for U.S. Appl. No. 10/894,978".
"Office Action from USPTO dated Sep. 23, 2008 for U.S. Appl. No. 12/031,585".
Naik, D. "Inside Windows Storage:Server Storage Technologies for Windows 2000, Windows Server 2003 and Beyond", *Addison-Wesley*, US, Chapter 5, XP-002381152, (Jul. 15, 2003),137-173.
"Deliver Server-Free Backup", *Pathlight & Computer Associates*, White Paper of Apr. 2000, Ithaca, New York, XP-002381153,1-8.
Brown, Douglas W., "A State-Machine Synthesizer", *18th Design Automation Conference*, (1981),301-305.
"Examination Report from the European Patent Office dated Oct. 12, 2007 for European Application No. 05 805 632.6".
"Office Action from USPTO dated Mar. 21, 2006 for U.S. Appl. No. 10/889,588".
"Office Action from USPTO dated Sep. 10, 2007 for U.S. Appl. No. 10/889,255".
"Office Action from USPTO dated Nov. 15, 2006 for U.S. Appl. No. 10/263,858".
"Office Action from USPTO dated Jul. 11, 2007 for U.S. Appl. No. 10/263,858".
"Office Action from USPTO dated Jan. 19, 2007 for U.S. Appl. No. 10/302,149".
"Office Action from USPTO dated Aug. 20, 2007 for U.S. Appl. No. 10/302,149".
"Office Action from USPTO dated Jul. 3, 2007 2007 for U.S. Appl. No. 10/664,548".
"Office Action from USPTO dated Sep. 20, 2007 for U.S. Appl. No. 10/798,527".
"Office Action from USPTO dated Sep. 20, 2007 for U.S. Appl. No. 10/889,267".
"Office Action from USPTO dated Aug. 31, 2007 for U.S. Appl. No. 10/889,635".
"Office Action from USPTO dated Sep. 4, 2007 for U.S. Appl. No. 10/889,551".

"Office Action from USPTO dated Sep. 20, 2007 for U.S. Appl. No. 10/889,259".
"Office Action from USPTO dated Sep. 19, 2007 for U.S. Appl. No. 10/894,492".
"Office Action from USPTO dated Oct. 4, 2007 for U.S. Appl. No. 10/894,627".
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Oct. 25, 2007 for U.S. Appl. No. 10/894,579".
"Office Action from USPTO dated Oct. 11, 2007 for U.S. Appl. No. 10/894,629".
"Office Action from USPTO dated Oct. 25, 2007 for U.S. Appl. No. 10/894,536".
"Office Action from USPTO dated Nov. 13, 2007 for U.S. Appl. No. 10/894,586".
"Office Action from USPTO dated Oct. 17, 2007 for U.S. Appl. No. 10/894,917".
"Office Action from USPTO dated Jun. 28, 2007 for U.S. Appl. No. 10/894,529".
"Office Action from USPTO dated Sep. 14, 2007 for U.S. Appl. No. 10/894,978".
"Office Action from USPTO dated Apr. 6, 2007 for U.S. Appl. No. 10/956,718".
"Office Action from USPTO dated Oct. 3, 2007 for U.S. Appl. No. 10/956,717".
"Office Action from USPTO dated Jun. 1, 2007 for U.S. Appl. No. 10/961,463".
"Office Action from USPTO dated Sep. 6, 2007 for U.S. Appl. No. 10/889,337".
Malavalli, et al., "Fibre Channel Framing and Signaling (FC-FS) Rev 1.10", *NCITS working draft proposed American National Standard for Information Technology*, (Jan. 25, 2001).
"Office Action from USPTO dated Jan. 19, 2006 for U.S. Appl. No. 10/212,425".
"Office Action from USPTO dated Dec. 5, 2006 for U.S. Appl. No. 10/212,425".
"Office Action from USPTO dated May 21, 2007 for U.S. Appl. No. 10/212,425".
"Office Action from USPTO dated Oct. 18, 2006 for U.S. Appl. No. 10/241,153".
"Office Action from USPTO dated Apr. 3, 2007 for U.S. Appl. No. 10/241,153".
"Office Action from USPTO dated Nov. 16, 2007 for U.S. Appl. No. 10/241,153".
"Notice of Allowance from USPTO dated Mar. 6, 2009 for U.S. Appl. No. 10/956,502".
"Office Action from USPTO dated Mar. 9, 2009 for U.S. Appl. No. 11/057,912".
"Notice of Allowance from USPTO dated Mar. 9, 2009 for U.S. Appl. No. 10/889,635".
"Notice of Allowance from USPTO dated Mar. 20, 2009 for U.S. Appl. No. 10/894,978".
"Notice of Allowance from USPTO dated Mar. 23, 2009 for U.S. Appl. No. 12/198,644".
"Office Action from USPTO dated Mar. 25, 2009 for U.S. Appl. No. 10/894,546".
"Notice of Allowance from USPTO dated Mar. 31, 2009 for U.S. Appl. No. 12/031,585".
"Office Action from USPTO dated Apr. 2, 2009 for U.S. Appl. No. 10/889,256".
"Examination Report from European Patent Office dated Mar. 27, 2009 for European Application No. 05798761.2".
"Notice of Allowance from USPTO dated May 5, 2009 for U.S. Appl. No. 10/798,468".
"Office Action from USPTO dated May 14, 2009 for U.S. Appl. No. 11/682,199".
"Notice of Allowance from USPTO dated May 18, 2009 for U.S. Appl. No. 10/894,917".
"Notice of Allowance from USPTO dated May 26, 2009 for U.S. Appl. No. 10/894,627".
"Office Action from USPTO dated Jun. 25, 2009 for U.S. Appl. No. 10/894,547".
"Notice of Allowance from USPTO dated Jul. 6, 2009 for U.S. Appl. No. 10/894,587".
"Notice of Allowance from USPTO dated Jul. 9, 2009 for U.S. Appl. No. 10/894,726".
"Office Action from USPTO dated Jul. 23, 2009 for U.S. Appl. No. 10/894,732".
"Office Action from Chinese State Intellectual Property Office dated Jul. 10, 2009 for Chinese Application No. 200580032888.6".
"Office Action dated Jun. 19, 2009 from State Intellectual Property Office for Chinese Application No. 200580032948.4".
"Office Action from USPTO dated Sep. 8, 2009 for U.S. Appl. No. 11/743,852".
"Office Action from USPTO dated Sep. 25, 2009 for U.S. Appl. No. 11/682,199".
"Final Office Action from USPTO dated Oct. 26, 2009 for U.S. Appl. No. 10/894,546".
"Notice of Allowance from USPTO dated Nov. 2, 2009 for U.S. Appl. No. 12/189,497".
"Final Office Action from USPTO dated Nov. 10, 2009 for U.S. Appl. No. 11/057,912".
"Office Action from USPTO dated Dec. 2, 2009 for U.S. Appl. No. 12/141,519".
"Office Action from China State Intellectual Property Office dated Dec. 11, 2009 for Chinese Applicationi No. 200580032948.4".
"Office Action from State Intellectual Property Office dated Dec. 4, 2009 for Chinese Application No. 200580032947.X".
"Notice of Allowance from USPTO dated Jan. 21, 2010 for U.S. Appl. No. 10/894,547".
"Final Office Action from USPTO dated Feb. 12, 2010 for U.S. Appl. No. 10/894,732".
"Final Office Action from USPTO dated Mar. 4, 2010 for U.S. Appl. No. 10/957,465".
"Office Action from USPTO dated Mar. 29, 2010 for U.S. Appl. No. 12/189,502".
"Notice of Allowance from USPTO dated Apr. 7, 2010 for U.S. Appl. No. 11/682,199".
"Office Action from USPTO dated Apr. 23, 2010 for U.S. Appl. No. 12/191,890".
"Communication Under Rule 71(3) EPC indicating allowance of application dated Apr. 9, 2010 from European Patent Office for European Application No. 05798761.2".
"Notification of Grant of Patent from the State Intellectual Property Office of P.R.C. dated Mar. 25, 2010 for Chinese Application No. 200580032948.4".
"Office Action from USPTO dated May 27, 2010 for U.S. Appl. No. 12/267,188".
"Notice of Allowance from USPTO dated May 28, 2010 for U.S. Appl. No. 12/141,519".
"Office Action from State Intellectual Property Office of China dated May 20, 2010 for Chinese Application No. 200580032947.X".
"Office Action from USPTO dated Jun. 10, 2010 for U.S. Appl. No. 12/259,197".
"Notice of Allowance from USPTO dated Jul. 19, 2010 for U.S. Appl. No. 10/894,546".
"Notice of Allowance from USPTO dated Aug. 18, 2010 for U.S. Appl. No. 10/957,465".
"Notice of Allowance from USPTO dated Aug. 19, 2010 for U.S. Appl. No. 12/267,188".
"Notice of Allowance from USPTO dated Aug. 18, 2010 for U.S. Appl. No. 12/191,890".
"Office Action from USPTO dated Sep. 23, 2010 for U.S. Appl. No. 12/476,068".
"Office Action from USPTO dated Oct. 7, 2010 for U.S. Appl. No. 12/473,150".
"Office Action from USPTO dated Oct. 7, 2010 for U.S. Appl. No. 12/432,168".
"Office Action from USPTO dated Oct. 28, 2010 for U.S. Appl. No. 12/189,502".
"Notice of Allowance from USPTO dated Dec. 17, 2010 for U.S. Appl. No. 12/473,150".

"Notice of Allowance from USPTO date Jan. 6, 2011 for U.S. Appl. No. 10/894,732".
"Office Action from USPTO dated Feb. 15, 2011 for U.S. Appl. No. 12/427,966".
"Notice of Allowance from USPTO dated Feb. 18, 2011 for U.S. Appl. No. 12/189,502".
"Office Action from USPTO dated Mar. 29, 2011 for U.S. Appl. No. 12/502,973".
"Notice of Allowance from USPTO dated Sep. 23, 2011 for U.S. Appl. No. 12/427,966".
"Final Office Action from USPTO dated Aug. 22, 2011 for U.S. Appl. No. 12/502,973".
"Notice of Allowance from USPTO dated Jun. 13, 2011 for U.S. Appl. No. 12/697,994".
"Final Office Action from USPTO dated Jul. 29, 2011 for U.S. Appl. No. 12/427,966".
"Office Action from State Intellectual Property Office dated Mar. 31, 2012 for Chinese Application No. 200580032888.6".

* cited by examiner

| Amount of max Length Frame Received | RPORT RX_Rate = 10G | | | | RPORT RX_Rate = 20G | | | | RPORT RX_Rate = 40G | | | |
|---|---|---|---|---|---|---|---|---|---|---|---|---|
| | > 1 Slot Empty | | <= 1 Slot Empty | | > 1 Slot Empty | | <= 1 Slot Empty | | > 1 Slot Empty | | <= 1 Slot Empty | |
| | 40G Cut | 20G Cut | 40G Cut | 20G Cut | 40G Cut | 20G Cut | 40G Cut | 20G Cut | 40G Cut | 20G Cut | 40G Cut | 20G Cut |
| 0/0 < rcvd < 1/2 | 0 | 0 | 0 | 0 | 0 | 0 | 0 | 0 | 0 | 0 | 0 | 0 |
| 1/2 < rcvd < 3/4 | 0 | 1 | 0 | 0 | 1 | 1 | 0 | 0 | 1 | 1 | 0 | 0 |
| 3/4 < rcvd < EOF | 1 | 1 | 0 | 0 | 1 | 1 | 0 | 0 | 1 | 1 | 0 | 0 |
| EOF Received | 1 | 1 | 1 | 1 | 1 | 1 | 1 | 1 | 1 | 1 | 1 | 1 |

FIGURE 3

HIGH SPEED FIBRE CHANNEL SWITCH ELEMENT

BACKGROUND

1. Field of the Invention

The present invention relates to Fibre Channel networks, and more particularly to a Fibre Channel switch element that can operate at a high speed.

2. Background of the Invention

Fibre Channel is a set of American National Standard Institute (ANSI) standards, which provide a serial transmission protocol for storage and network protocols such as HIPPI, SCSI, IP, ATM and others. Fibre Channel provides an input/output interface to meet the requirements of both Channel and network users.

Fibre Channel supports three different topologies: point-to-point, arbitrated loop and Fibre Channel fabric. The point-to-point topology attaches two devices directly. The arbitrated loop topology attaches devices in a loop. The Fibre Channel fabric topology attaches host systems directly to a fabric, which are then connected to multiple devices. The Fibre Channel fabric topology allows several media types to be interconnected.

In Fibre Channel, a path is established between two nodes where the path's primary task is to transport data from one point to another at high speed with low latency, performing only simple error detection in hardware.

Fibre Channel fabric devices include a node port or "N_Port" that manages fabric connections. The N_port establishes a connection to a fabric element (e.g., a switch) having a fabric port or "F_port". Fabric elements include the intelligence to handle routing, error detection, recovery, and similar management functions.

A Fibre Channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port Fibre Channel switch.

Fibre Channel switches use memory buffers to hold frames received and sent across a network. Associated with these buffers are credits, which are the number of frames that a buffer can hold per fabric port.

Current Fibre Channel standards define switch port/link operations to occur at 1 gigabit per second ("G"), 2G, 4G and 10G. However, as bandwidth increases a need for 20G, 40G or higher port/link operation will occur. Conventional standards and Fibre Channel switches do not provide Fibre Channel switches that can operate at such high speeds.

Therefore, there is a need for a Fibre Channel switch whose ports can be selected to operate at high speeds, for example, at 10G, 20G or 40G.

SUMMARY OF THE PRESENT INVENTION

In one aspect of the present invention, a high-speed Fibre Channel switch element is provided. The Fibre Channel switch element includes, a rate select module that allows a port in the Fibre Channel switch element to operate at a rate equal to and/or higher than 10 gigabits per second ("G"). The port may operate at 20G, 40G or at a rate greater than 40G.

Also, a cut status is provided for cut-through routing between ports operating at different speed. Plural transmit and receive lines are used for port operation at a rate equal to or higher than 10G.

In another aspect of the present invention, a Fibre Channel network is provided. The network includes a Fibre Channel switch element including a rate select module that allows a port in the Fibre Channel switch element to operate at a rate equal to and/or higher than 10G, as described above.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions:

The following definitions are provided as they are typically (but not exclusively) used in the Fibre Channel environment, implementing the various adaptive aspects of the present invention.

"E_Port": A fabric expansion port that attaches to another Interconnect port to create an Inter-Switch Link.

"F_Port": A port to which non-loop N_Ports are attached to a fabric and does not include FL_ports.

"Fibre Channel ANSI Standard": The standard (incorporated herein by reference in its entirety) describes the physical interface, transmission and signaling protocol of a high performance serial link for support of other high level protocols associated with IPI, SCSI, IP, ATM and others.

"Fabric": The structure or organization of a group of switches, target and host devices (NL_Port, N_ports etc.).

"N-Port": A direct fabric attached port, for example, a disk drive or a HBA.

"NL_Port": A L_Port that can perform the function of a N_Port.

"Port": A general reference to N. Sub.—Port or F.Sub.—Port.

"Switch": A fabric element conforming to the Fibre Channel Switch standards.

To facilitate an understanding of the preferred embodiment, the general architecture and operation of a Fibre Channel switch system/element will be described. The specific architecture and operation of the preferred embodiment will then be described with reference to the general architecture.

Fibre Channel System

Figure 1A:
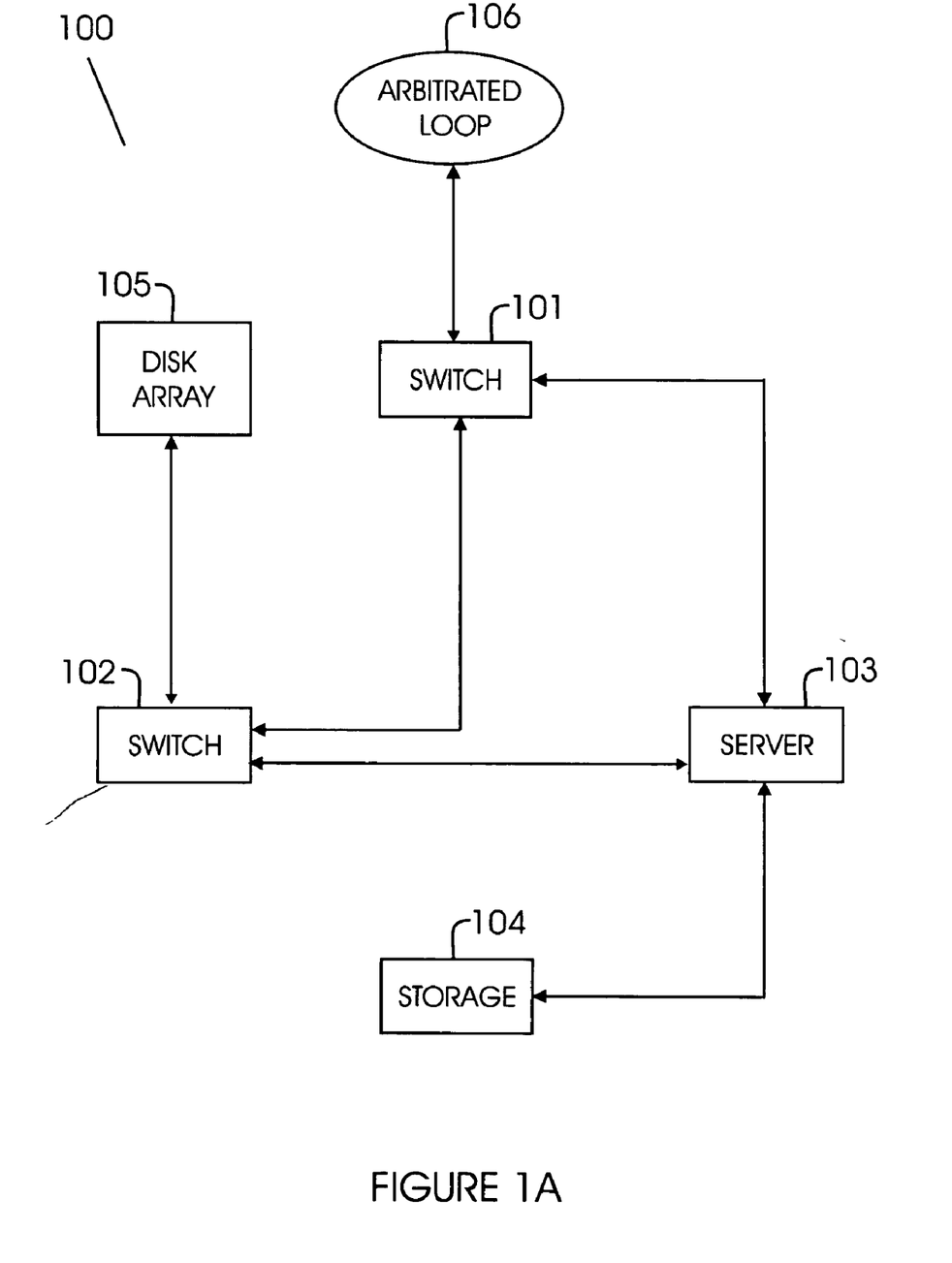
FIG. 1A shows an example of a Fibre Channel network.

FIG. 1A is a block diagram of a Fibre Channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N_Port in server 103 may establish a path with disk array 105 through switch 102.

Switch Element

Figure 1B:
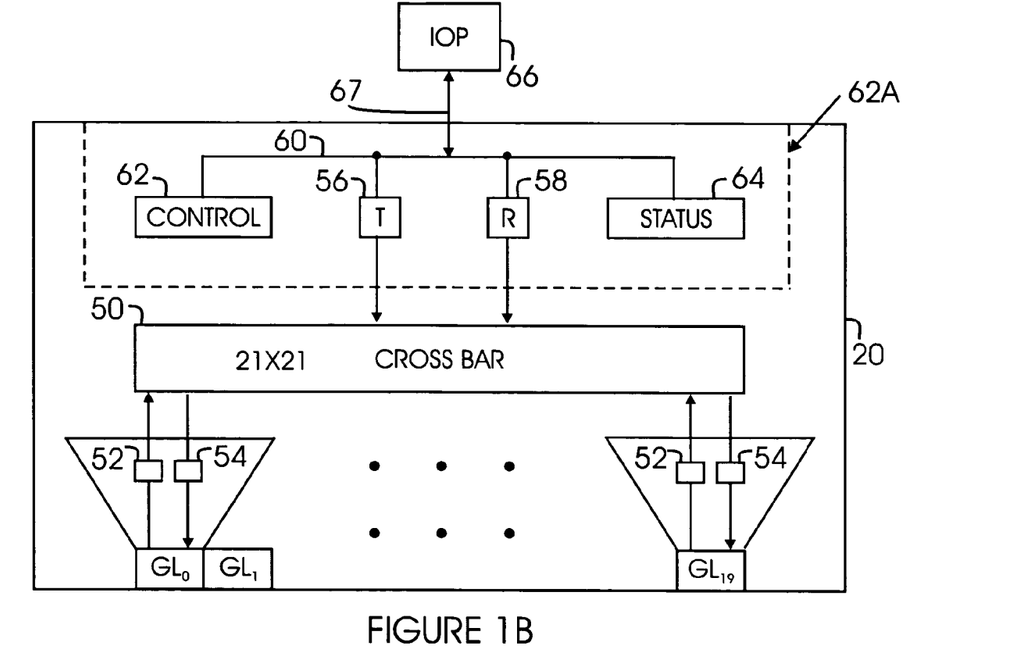
FIG. 1B shows an example of a Fibre Channel switch element, according to one aspect of the present invention.

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking Fibre Channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
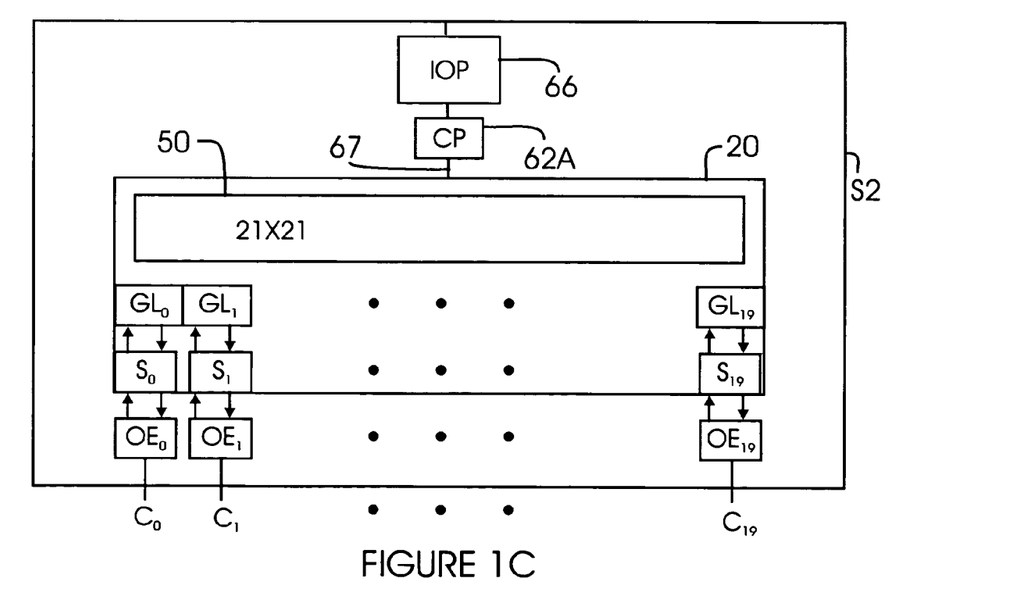
FIG. 1C shows a block diagram of a 20-channel switch chassis, according to one aspect of the present invention.

In the preferred embodiments of switch chassis described herein, the fabric controller is a firmware-programmed microprocessor, also referred to as the input/output processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL_Ports correspond to channel C0-C19. Each GL_Port has a serial/deserializer (SERDES) designated as S0-S19. Ideally, the SERDES functions are implemented on ASIC 20 for efficiency, but may alternatively be external to each GL_Port. The SERDES converts parallel data into a serial data stream for transmission and converts received serial data into parallel data. The 8 bit to 10 bit encoding enables the SERDES to generate a clock signal from the received data stream.

Each GL_Port may have an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
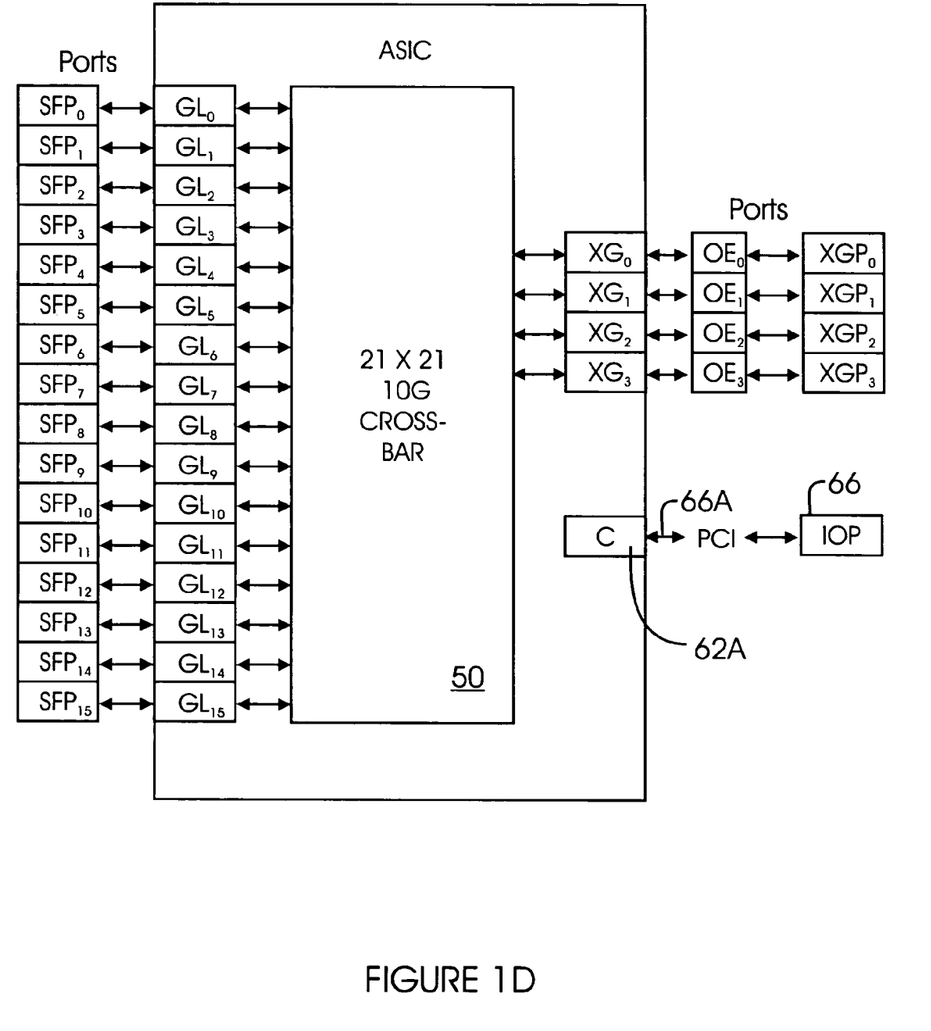
FIG. 1D shows a block diagram of a Fibre Channel switch element with sixteen GL_Ports and four XG ports, according to one aspect of the present invention.

FIG. 1D shows a block diagram of ASIC 20 with sixteen GL ports and four high-speed port control modules designated as XG0-XG3 (for example, 10G, 20G or 40G). ASIC 20 include a control port 62A that is coupled to IOP 66 through a PCI connection 66A.

Details of how switch 20 is operated is provided in U.S. patent application Ser. No. 10/894,587, filed on Jul. 20, 2004, the disclosure of which is incorporated herein by reference in its entirety.

Figure 2:
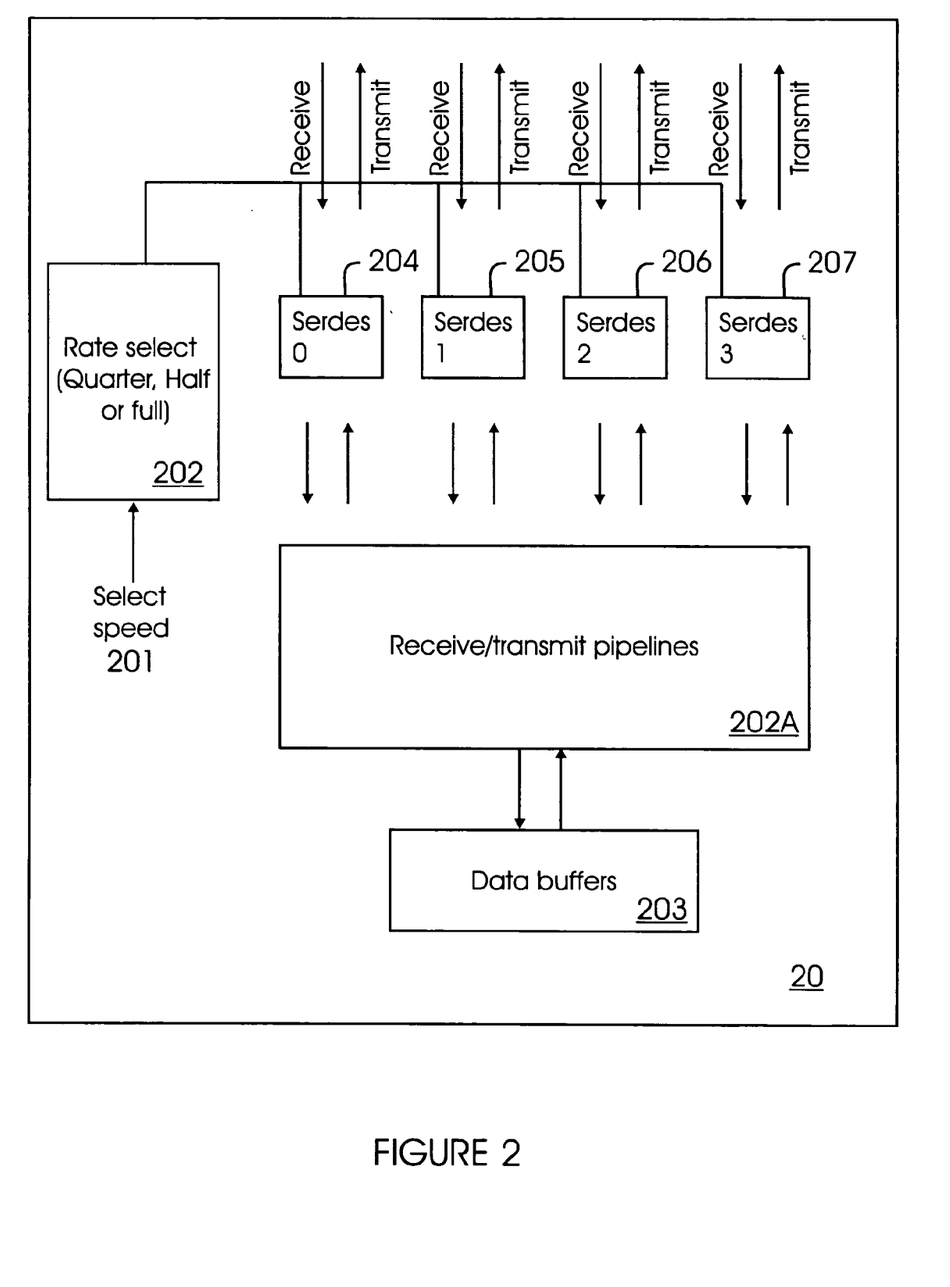
FIG. 2 shows a block diagram of a Fibre Channel switch with a rate select module, according to one aspect of the present invention.

FIG. 2 shows another block diagram of switch element 20, according to one aspect of the present invention. Switch element 20 has receive and transmit pipelines 202A that operate in the manner described in the aforementioned patent application using plural data buffers 203.

A rate select module 202 is provided that selects a particular speed for a port based on a select speed signal 201 that is generated from the common port 62A. Firmware for switch element 20 may be used to generate signal 201. Module 202 provides the appropriate clock and configuration signals for a 10G, 20G, 40G or port/link operation at any rate.

A port can negotiate with another port to operate at 10G/20G/40G or any other rate. A port may operate at 10G, 20G, 40G, 10G and 20G, 20G and 40G or any other combination. The negotiation process may be similar to that described in the FC-FS Fibre Channel standard. The 'RF" primitive may be used to replace the "NOS" primitive, as discussed in FC-FS.

SERDES 204, 205, 206 and 207 converts parallel 10 bit characters into a serial stream on the transmit side (i.e. data to the network) and converts data received by switch element 20 into 10-bit characters. SERDES 204-207 recover clock information from data that is received by a port.

In one aspect of the present invention, for a 20G operation, 4 serial streams (i.e., four transmit and four receive lanes) (as shown in FIG. 2 with SERDES 204-207) at 6.375G may be used. Each lane encodes/decodes a byte of data using 8B/10B code. The 20G ports may be connected through passive copper, actively driven copper or optical at the same or different wavelengths (one wavelength for each lane) paths (not shown).

For a 40G operation, 4 serial streams each at 12.75G may be used. Each lane encodes/decodes a byte of data using 8B/10B code. The four lanes are synchronized and aligned, as described in the aforementioned patent application.

It is noteworthy that the invention is not limited to any particular number of serial streams; for example, a single stream may be used to operate a port at 20G/40G or any other rate. Also, the serial streams may operate at the same optical wavelength or different wavelengths; one for each serial stream.

SERDES 204-207 clock rates are manipulated to facilitate higher speed operation. Currently the XAUI interface (incorporated herein by reference in its entirety) supports 10G operation using four transmit and four receive lanes; each lane encoding data with an 8B/10B code for differential serial transmission and operating at 3.1875 GigaBaud. To operate at higher speeds, a full rate will be at 12.75 GigaBaud, half rate will be at 6.375 GigaBaud. The full rate, half and quarter rates are selected by module 202, based on signal 201.

Cut-Through Routing at Higher Speeds:

"Cut" bits are a status signal sent from receive to transmit buffers to keep the transmit buffer running as quickly as possible by either guaranteeing that the transmit port either does not run out of data or by allowing the transmit port to re-arbitrate its tags to select a frame source that has the "cut" bit set. The use of cut bits at lower rates (i.e., 1G, 2G, 4G and 10G) is described in the aforementioned patent application. The Cut Bits may be expanded to include 20G, 40G or higher transfer rates.

To reduce latency, a frame is released from a receive buffer, after a certain threshold value is reached. However, if the receive buffer slots become almost full with other frames, then new incoming frames wait for the end of frame ("EOF"). This reduces contention time on shared resources that may occur if the receive buffer is tied up for "cut" through routing.

Figure 3:
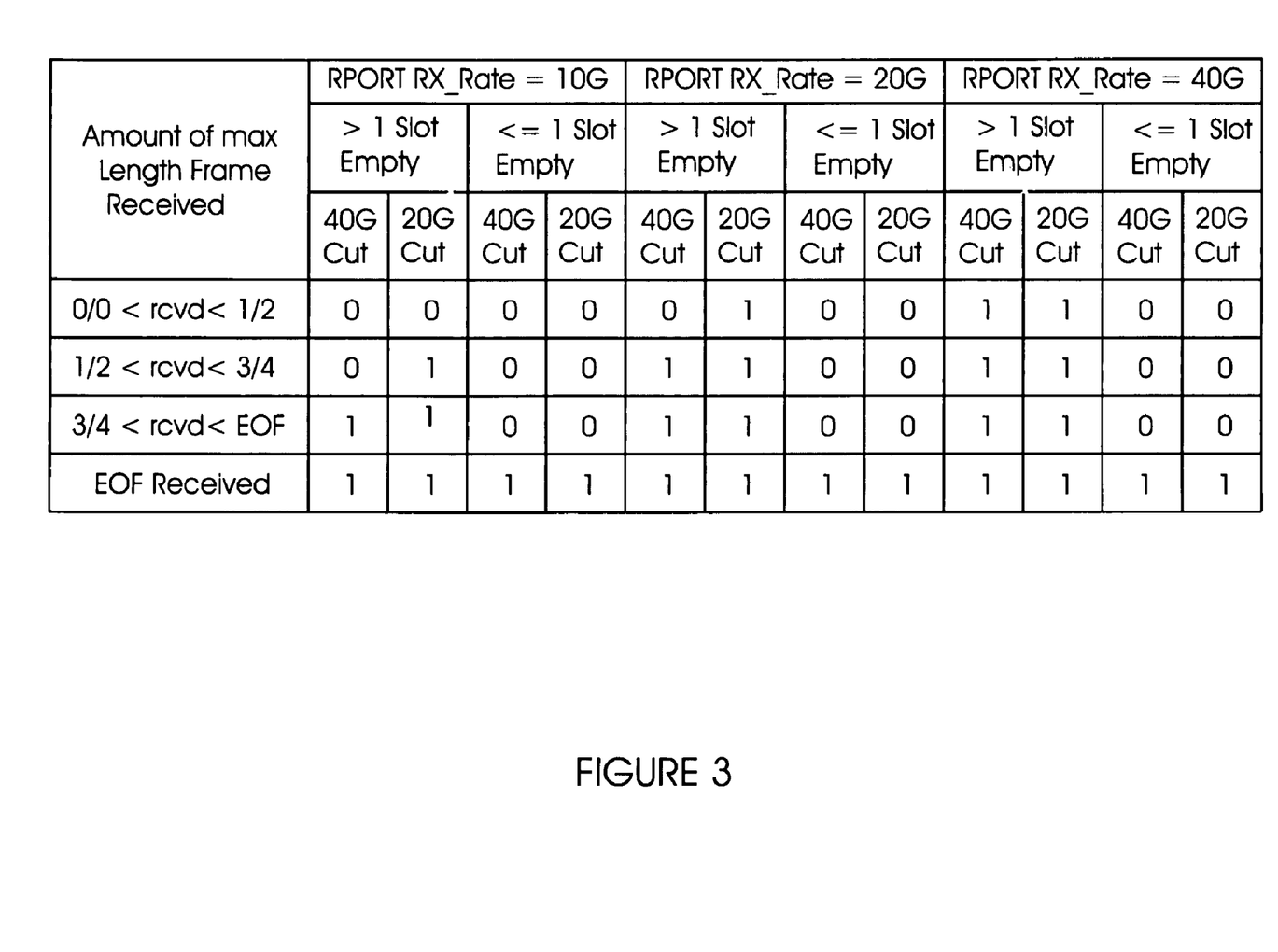
FIG. 3 shows a table for cut-through routing, according to one aspect of the present invention.

There are different conditions on cut status depending on what kind of port the Receive Buffer resides in (for example, 10G/20G/40G or any other speed). The selection of cut status also depends on the type of port the Transmit Port resides in. Table I in FIG. 3, shows how some cut through frame length calculations are performed depending upon port transfer rates.

In one aspect of the present invention, a port can be configured to operate at different rates. High bandwidth operation is permitted for better performance.

Although the present invention has been described with reference to specific embodiments, these embodiments are illustrative only and not limiting. Many other applications and embodiments of the present invention will be apparent in light of this disclosure and the following claims.

What is claimed is:

1. A Fibre Channel switch element, comprising:
   a plurality of ports for sending and receiving frames; wherein each port is configurable to operate at more than one operating speed and includes a receive segment for receiving frames and a transmit segment for transmitting frames; and
   a rate select module that receives a select speed signal from a common port of the switch element generated by firmware executed by a switch element processor, and based on the select speed signal, the rate select module provides a clock and a configuration signal to select an operating rate of a serializer/deserializer (SERDES) from among a plurality of SERDES to configure a port from among the plurality of ports to operate at a rate equal to or higher than 10 gigabits per second ("G").

2. The Fibre Channel switch element of claim 1, wherein the port is configured to operate at 20G (gigabits per second).

3. The Fibre Channel switch element of claim 1, wherein the port is configured to operate at 40G (gigabits per second).

4. The Fibre Channel switch element of claim 1, wherein the port is configured to operate at a rate greater than 40G (gigabits per second).

5. The Fibre Channel switch element of claim 1, wherein the port configured to operate at a rate equal to or greater than 10G negotiates a transfer rate with other ports.

6. The Fibre Channel switch element of claim 1, wherein a cut status is used for cut-through routing between ports operating at different speeds.

7. The Fibre Channel switch element of claim 1, wherein a plurality of transmit and receive lanes are used for port operation at a rate equal to or higher than 10G.

8. The Fibre Channel switch element of claim 7, wherein for 20G operation each lane operates at 6.375 Gigabaud.

9. The Fibre Channel switch element of claim 7, wherein for 40G operation, each lane operates at 12.75 Gigabaud.

10. The Fibre Channel switch element of claim 7, wherein ports configured to operate at 20G and 40G port are connected using passive copper or actively driven copper paths.

11. The Fibre Channel switch element of claim 7, wherein ports configured to operate at 20G and 40G port are connected using optical transmission at the same or different wavelengths when multiple serial streams are used.

12. A Fibre Channel network, comprising:
    a Fibre Channel switch element including a plurality of ports for sending and receiving frames; wherein each port is configurable to operate at more than one operating speed and includes a receive segment for receiving frames and a transmit segment for transmitting frames; and a rate select module that receives a select speed signal from a common port of the switch element generated by firmware executed by a switch element processor, and based on the select speed signal, the rate select module provides a clock and a configuration signal to select an operating rate of a serializer/deserializer (SERDES) from among a plurality of SERDES to configure a port from among the plurality of ports to operate at a rate equal to or higher than 10 gigabits per second ("G").

13. The Fibre Channel network of claim 12, wherein the port is configured to operate at 20G (gigabits per second).

14. The Fibre Channel network of claim 12, wherein the port is configured to operate at 40G (gigabits per second).

15. The Fibre Channel network switch of claim 12, wherein the port is configured to operate at a rate greater than 40G (gigabits per second).

16. The Fibre Channel network of claim 12, wherein the port configured to operate at a rate equal to or greater than 10G negotiates a transfer rate with other ports.

17. The Fibre Channel switch element of claim 12, wherein a cut status is used for cut-through routing between ports operating at different speeds.

18. The Fibre Channel switch element of claim 12, wherein a plurality of transmit and receive lanes are used for port operation at a rate equal to or higher than 10G.

19. The Fibre Channel switch element of claim 18, wherein for 20G operation each lane operates at 6.375 Gigabaud.

20. The Fibre Channel switch element of claim 18, wherein for 40G operation, each lane operates at 12.75 Gigabaud.

21. The Fibre Channel switch element of claim 18, wherein ports configured to operate at 20G and 40G port are connected using passive copper or actively driven copper paths.

22. The Fibre Channel switch element of claim 18, wherein ports configured to operate at 20G and 40G port are connected using optical transmission at the same or different wavelengths when multiple serial streams are used.

23. A switch element, comprising:
  a plurality of ports for sending and receiving frames; wherein each port is configurable to operate at more than one operating speed and includes a receive segment for receiving frames and a transmit segment for transmitting frames; and
  a rate select module that receives a select speed signal from a common port of the switch element generated by firmware executed by a switch element processor, and based on the select speed signal, the rate select module provides a clock and a configuration signal to select an operating rate of a serializer/deserializer (SERDES) from among a plurality of SERDES to configure a port from among the plurality of ports to operate at a rate equal to or higher than 10 gigabits per second ("G").

24. The switch element of claim 23, wherein the port is configured to operate at 20G, 40G, and greater than 40G.

* * * * *

UNITED STATES PATENT AND TRADEMARK OFFICE
CERTIFICATE OF CORRECTION

PATENT NO. : 8,295,299 B2  
APPLICATION NO. : 10/956501  
DATED : October 23, 2012  
INVENTOR(S) : Frank R. Dropps et al.

Page 1 of 1

It is certified that error appears in the above-identified patent and that said Letters Patent is hereby corrected as shown below:

On Title Page 6, Item (56), under "Other Publications", column 2, line 26, delete "Applicationi" and insert -- Application --, therefor.

In the Specifications:

In column 4, line 56, delete "'RF'"" and insert -- "RF" --, therefor.

In the Claims:

In column 6, line 52, delete "switch", therefor.

In column 6, line 58, delete "switch element" and insert -- network --, therefor.

In column 6, line 61, delete "switch element" and insert -- network --, therefor.

In column 6, line 64, delete "switch element" and insert -- network --, therefor.

In column 6, line 66, delete "switch element" and insert -- network --, therefor.

In column 7, line 1, delete "switch element" and insert -- network --, therefor.

In column 7, line 4, delete "switch element" and insert -- network --, therefor.

Signed and Sealed this  
Fourteenth Day of May, 2013

Teresa Stanek Rea  
*Acting Director of the United States Patent and Trademark Office*